United States Patent [19]

Ooi

[11] Patent Number: 4,924,376

[45] Date of Patent: May 8, 1990

[54] SYSTEM FOR DYNAMICALLY ADJUSTING THE ACCUMULATION OF INSTRUCTIONS IN AN INSTRUCTION CODE PREFETCHED PIPELINED COMPUTER

[75] Inventor: Yasushi Ooi, Tokyo, Japan

[73] Assignee: NEC Corporation, Tokyo, Japan

[21] Appl. No.: 947,209

[22] Filed: Dec. 29, 1986

[30] Foreign Application Priority Data

Dec. 26, 1985 [JP] Japan .................. 60-294162

[51] Int. Cl.$^5$ ............ G06F 9/38; G06F 13/18; G06F 9/24
[52] U.S. Cl. ............... 364/200; 364/242.6; 364/242.91; 364/244; 364/244.3; 364/261.3; 364/263.1
[58] Field of Search ... 364/900 MS File, 200 MS File

[56] References Cited

U.S. PATENT DOCUMENTS

| | | | |
|---|---|---|---|
| 3,348,209 | 10/1976 | Brooks | 364/900 |
| 4,057,846 | 11/1977 | Cockerill et al. | 364/200 |
| 4,062,059 | 12/1977 | Suzuki et al. | 364/900 |
| 4,096,572 | 6/1978 | Namimoto | 364/200 |
| 4,442,484 | 4/1984 | Childs,, Jr. et al. | 364/200 |
| 4,453,214 | 6/1984 | Adcock | 364/200 |
| 4,458,313 | 7/1984 | Suzuki et al. | 364/200 |
| 4,541,045 | 9/1985 | Kromer, III | 364/200 |
| 4,648,034 | 3/1987 | Heninger | 364/200 |

*Primary Examiner*—Archie E. Williams, Jr.
*Assistant Examiner*—Florin R. Muntenau
*Attorney, Agent, or Firm*—Foley & Lardner, Schwartz, Jeffery, Schwaab, Mack, Blumenthal & Evans

[57] ABSTRACT

An instruction code access control system used in an instruction code prefetched computer system includes at least an instruction buffer for accumulating prefetched instruction codes, and a data path switch for selectively coupling the instruction buffer to a data path through which an instruction code and an operand data are selectively transferred. The system also comprises a fetch counter for counting the number of the instruction codes accumulated in the instruction buffer from the time a discontinuous program control is carried out. There is provided a counter detector for comparing the value of the fetch counter with a predetermined value. An arbiter is provided for determining, on the basis of the output of the counter detector, a priority between an instruction memory access for instruction code prefetching and an operand access caused as the result of an instruction execution. The arbiter operates to control the data path switch in accordance with the result of the determination.

9 Claims, 2 Drawing Sheets

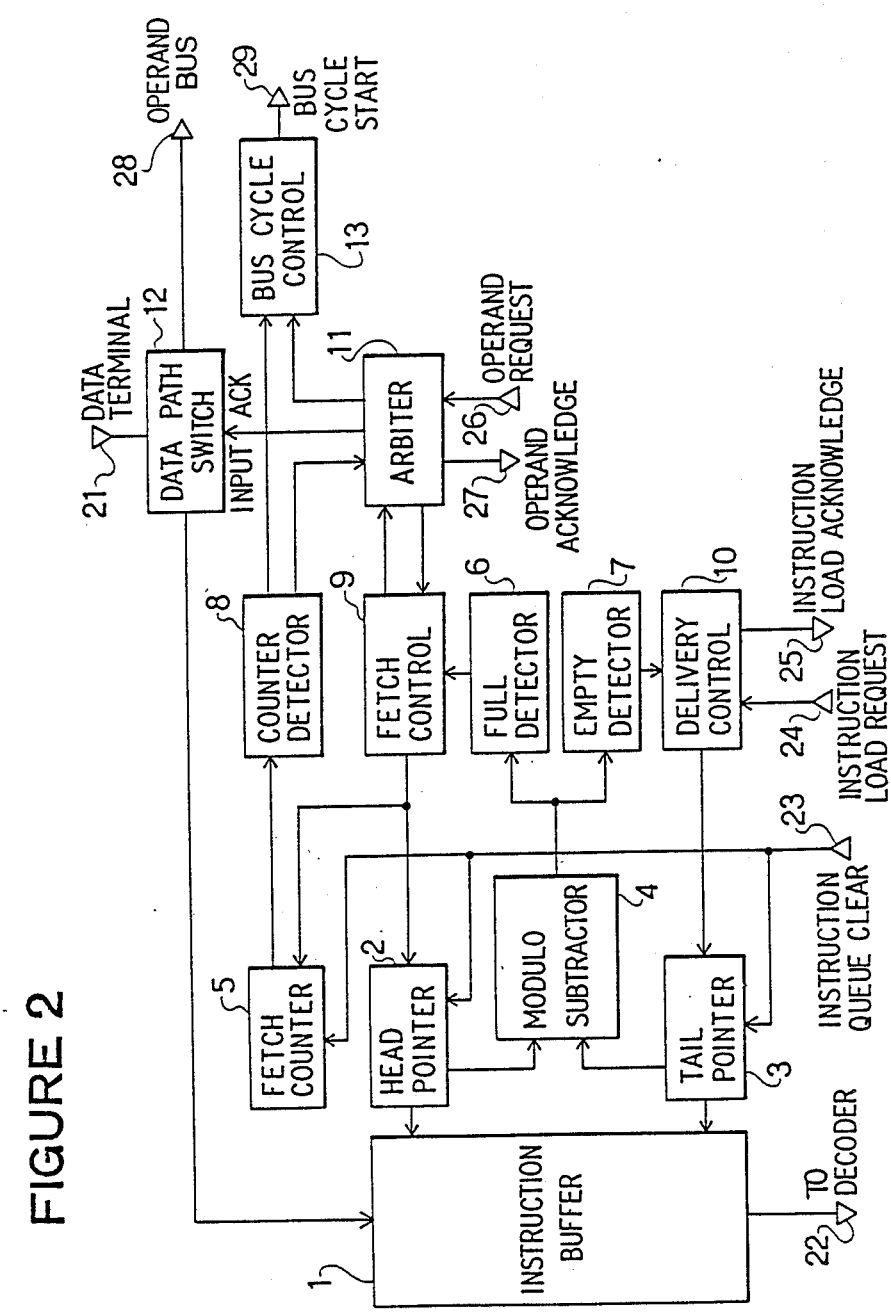

SYSTEM FOR DYNAMICALLY ADJUSTING THE ACCUMULATION OF INSTRUCTIONS IN AN INSTRUCTION CODE PREFETCHED PIPELINED COMPUTER

BACKGROUND OF THE INVENTION

1. Field of the Invention

The present invention relates to a pipelined computer system, and in particular to an instruction code access control system used in a pipelined processor.

2. Description of Related Art

In the prior art, it has been conceived to process respective stages of instruction executions in parallel as simultaneously as possible, such as reading an decoding of instruction codes, address calculation, operand access. This is called a "pipelined processing".

In general, a processor adapted for the pipelined operation is such that instruction codes are accessed through an address bus or data bus common to operand data, and therefore, a reading of an instruction code from a memory is often conflicted with an operand access of a preceding instruction to be executed in parallel with the reading operation of instruction codes from the memory.

To resolve the conflict, it is an ordinary practice to collect memory access requests issued at respective stages of pipeline processing to a memory interface portion of a processor system, so that an associated arbiter selects one of the requests and causes to execute an asynchronous memory access at a timing unrelated to the pipelined operation.

In this method, it becomes required that the respective stages of the pipeline processing issuing a memory access request have a buffer mechanism for waiting or accumulating the data which has caused the memory access request. It is also necessary to adjust the lag between the timing of the pipeline processing and that of access data outputted in an asynchronous way. In this method, on the contrary, the operation cycle of pipeline processing is not subjected to any limit by a memory access period, differently from the method in which a memory access is controlled in a pipeline processing manner. Accordingly, this method has an advantage capable of improving the efficiency of the overall system through improving the efficiency of a pipeline processing.

Furthermore, it has been a general practice to provide a buffer mechanism called an "instruction queue" for a stable supply of an instruction code in pipelined manner, so that an instruction code is read out and stored in the instruction queue only when operand data access of the preceding instruction is not carried out. This instruction code accumulating manner means that the instruction code access is set at a degree of priority lower than that of the operand data access.

As a result, this method has such a disadvantage that the instruction queue can secure only an insufficient amount of instruction codes in the next two cases, that is, (1) the case where the pipeline processing is resumed after the pipeline processing is discontinued and the instruction queue's content is cleared as the result of a conditional branch instruction, interrupt, or the like; and (2) the case where the instruction code access is interrupted for a long period on account of the frequent occurrence of operand data access.

The above shortage of the instruction codes stored in the instruction queue connotes the possibility of impeding the pipeline operation.

In order to surmount the above defects, it is considered to enhance the priority of instruction code access higher than that of operand data access, when the instruction queue becomes short in instruction codes stored. However, if the period of higher priority of instruction code access becomes too long, the following problems will occur.

(1) a normal pipeline processing may be interrupted because the operand access required for execution of an instruction is prevented; and (2) the amount of instruction codes having stored in the instruction queue invalidated at the time of branch, interrupt, or the like may be increased, and as a result the number of fruitless data access will increase. This problem will impede the efficiency improvement of the overall system, particularly where the time periods required for each stage of pipeline processing are improved in comparison to the time periods required for data access.

SUMMARY OF THE INVENTION

Accordingly, it is an object of the present invention to provide an instruction code access control system used in a pipelined processor, which has resolved the above mentioned drawbacks of the conventional processor.

Another object of the present invention is to provide an instruction code access control system which can ceaselessly accumulate instruction codes of an amount sufficient to maintain the pipelined processing and which can decrease the averaged amount of instruction codes invalidated or cleared.

Still another object of the present invention is to provide an instruction code access control system which can dynamically adjust the accumulation of instruction codes at an appropriate amount, so that the amount of instruction codes sufficient to maintain the pipelined processing is accumulated at any time and only a relatively small amount of accumulated instruction codes are cleared at generation of discontinuous program operation such as a conditional branch and interrupt.

To achieve the above objects, it is considered to alter the priority of the instruction code access as shown in the following:

(1) To secure a sufficient number of instruction codes in the instruction queue by setting up the priority of the instruction code access higher than that of operand access, immediately after a branch instruction execution or interrupt occurrence. This setting up is deemed appropriate from the fact that an instruction to be executed next will not appear for a while just after the branch or interrupt, and therefore, the instruction code access will not conflict with the operand access.

(2) To estimate occurrence time of the branch instruction and to set the priority of the instruction code access lower at the time when the near future execution of the branch instruction is estimated. It becomes possible by this setting up to reduce the amount of instruction codes invalidated at the time of the branch operation.

In order to realize the method of altering the desirable priority as above, it is also considered to utilize a dynamic parameter such as a run length of a program to be executed in a pipelined computer system. In general, it is possible in a computer system to compute the average number or average byte number of instructions executed between the execution of one branch instruction and that of the next branch instruction, in relation to the kinds of programs being used. The average byte number can be expressed by the average length of consecutive address area traced by an instruction pointer (program counter). This is called the average run length of the program. The average run length can be regarded as being the reciprocal number of branch operation frequency.

The average run length with respect to the instruction number depends upon an instruction set and a software type, which are used in the computer system concerned. For example, the average run length is short in a program for list processing, and on the other hand it becomes longer in the case of repeating vast numerical values operations.

Also, the average run length related to the instruction byte number depends upon the instruction format of the computer system concerned. Assuming that the length of all the instructions is three bytes, the average run length is just three times the instruction number, but generally there are several kinds of instruction length, each of which is employed in a different proportion. According to some statistical materials, distribution of consecutive address areas's length traced by an instruction pointer is approximately as shown in FIG. 1. This figure means that in most of cases if instructions of the number corresponding to the average run length have been executed, the probability of continuous execution of further consecutive addresses' instructions is small, and furthermore, that the more the consecutive address instructions are executed, the smaller the probability of continuous execution of the next addresses' instruction becomes. Therefore, when a program is executed, if the average run length inherent to the program is known, it is possible to compute the probability of whether or not an instruction to be next executed is a branch instruction.

Furthermore, it is preferable to utilize this run length not only in altering the priority of instruction code access, but also in the method of altering consecutive instruction code access frequency at the time of memory access.

Interleaving or nibble accessing has been known as a method of making access to consecutive address areas in a memory more speedily. Even if the instruction codes stored in the instruction queue are invalidated or cleared, these techniques make it possible to read out the restarting address and the succeeding addresses more quickly than to gain access thereto one by one.

Accordingly, the above objects of the present invention are achieved by carrying out the priority control between an instruction code access and an operand data access, in accordance with a manner realizing the following two points.

(1) To be able to cope with the invalidation of the contents of the instruction queue on account of conditional branch and interrupts, and the decrease in contents of the instruction queue on account of extreme increase in operand data access, thereby to store sufficient instruction codes in the instruction queue for maintaining the pipeline processing on the average.

(2) To decrease the average amount of instruction codes invalidated on account of conditional branching or interrupts.

The above and other objects of the present invention have been attained in accordance with the present invention by an instruction code access control system used in an instruction code prefetched computer system which includes at least a unit, for accumulating prefetched instruction codes, and a unit for selectively coupling the instruction code accumulating unit to a data path through which an instruction code and an operand data are selectively transferred, wherein the improvement comprises a unit for counting the number of the instruction codes accumulated in the instruction code accumulating unit from the time a discontinuous program control is carried out, a unit for comparing the value of the counting unit with a predetermined value, and a unit for determining, on the basis of the output of the comparing unit, a priority between an instruction memory access for instruction code prefetching and an operand access caused as the result of an instruction execution, the priority determining unit operating to control the selectively coupling unit in accordance with the result of the determination.

Here, the term "discontinuous program control" means a movement of a program access control caused by a branch, subroutine call/return, interrupt, exception generation, etc.

In one embodiment, the instruction code accumulating unit includes an instruction buffer, and the selective coupling unit includes a data path switch put between an input of the instruction buffer, a memory access bus and an operand data bus.

Preferably, the system further includes a fetch controller for generating a signal to the instruction buffer so that the buffer fetches an instruction code. The counting means includes a fetch counter adapted to count the signal from the fetch controller and to be cleared at a clear signal, and the comparing unit includes a counter detector for comparing the count value of the fetch counter with the predetermined value so as to generate a first comparison signal when the count value of the fetch counter is less than the predetermined value, so that the priority determining means responds to the first comparison signal to cause the data path switch to couple the memory access bus to the instruction bus.

Furthermore, the determining unit includes an arbiter receiving the first comparison signal from the counter detector, an instruction buffer input request signal from the fetch controller and an operand request signal. This arbiter operates to respond to the first comparison signal to control the data path switch and to selectively output one of an instruction buffer input acknowledge signal and an operand acknowledge signal. In addition, the counter detector is adapted to generate a second comparison signal when the count value of the fetch counter is less than a second predetermined value which is not larger than the first mentioned predetermined value. Further, the arbiter is adapted to generate the highest priority access signal in response to the first comparison signal. This system further includes a bus cycle controller receiving a second comparison signal and the highest priority access signal to generate a bus cycle start signal.

Specifically, the system further includes a head pointer and a tail pointer associated to the instruction buffer and adapted to be cleared by the clear signal, the head pointer being updated by an update signal from the fetch controller, a substracter connected to the head pointer and the tail pointer to generate a difference signal representative of the amount of the instruction codes stored in the instruction buffer, and a full detector connected to receive a difference signal so as to control the fetch controller so that the fetch controller generates the instruction buffer input request signal to the arbiter.

The system further includes an empty detector connected to receive the difference signal, and a delivery controller connected to the empty detector and operating to generate an instruction code load acknowledge signal in response to an instruction code load request signal when the instruction buffer is not empty. This delivery controler operates to supply an updating signal to the tail pointer.

The above and other objects, features and advantages of the present invention will be apparent from the following description of preferred embodiments of the invention with reference to the accompanying drawings.

BRIEF DESCRIPTION OF THE DRAWINGS

FIG. 2 is a block diagram showing one preferred embodiment of the instruction code access control system in accordance with the present invention.

DESCRIPTION OF THE PREFERRED EMBODIMENT

Figure 1:
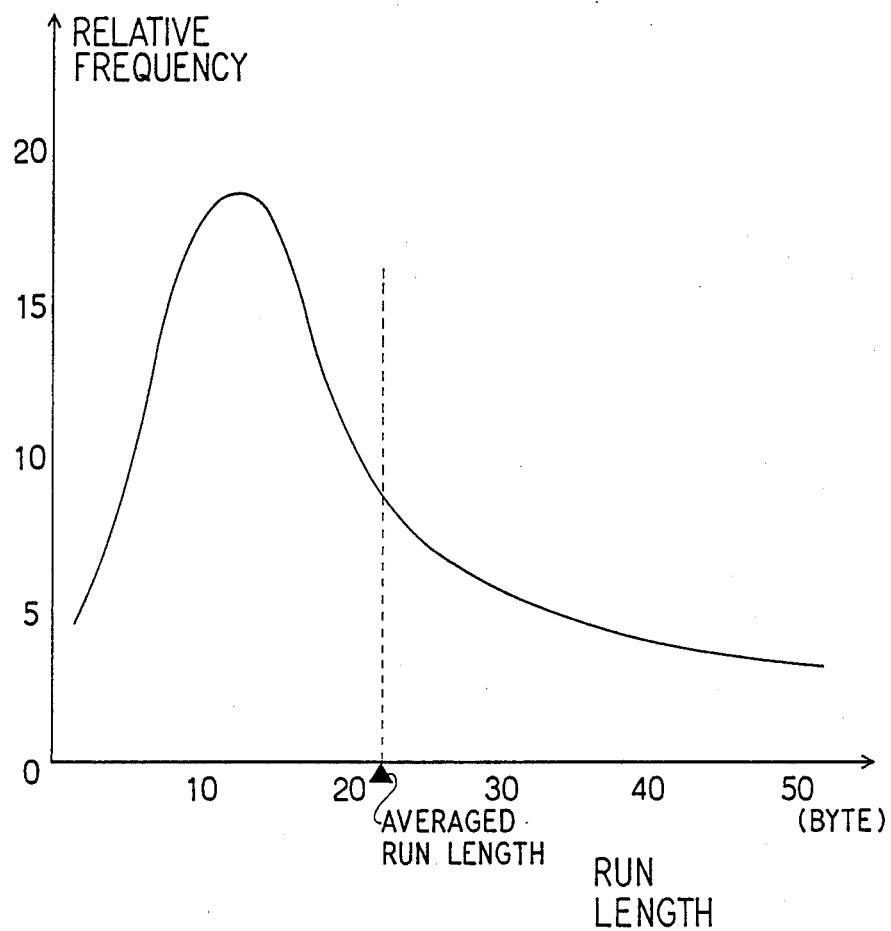
FIG. 1 is a graph showing the distribution of consecutive address area's length traced by an instruction pointer in a computer system, in which the abscissa shows the amount of instruction codes (run length) executed for a period from a discontinuous instruction transfer to the next discontinuous instruction transfer, the ordinate shows a relative frequency of continuous execution of the consecutive instruction codes, and the broken line shows the average value (average run length)

FIG. 2 shows a preferred embodiment of the instruction code access control system in accordance with the present invention and which can be used in a pipelined computer. The shown system comprises an instruction buffer 1 which stores instruction codes read through a data terminal 21 and a data bus switch 12 and outputs an instruction code through a bus 22 to an instruction decoder (not shown). This instruction buffer is associated with a head pointer 2, which indicates the top of an instruction buffer 1 when the instruction buffer 1 is regarded as a queue. There is also provided a tail pointer 3, which indicates the bottom of an instruction buffer 1 when the instruction buffer 1 is regarded a queue. These pointers 2 and 3 are connected to a modulo substracter 4, which computes how many instruction codes are stored in the instruction buffer 1 from the contents of both the head pointer 2 and the tail pointer 3.

The substracter 4 has an output connected to a full-detector 6, which detects from the output of the modulo substracter 4 whether or not the instruction buffer 1 is completely full of instruction codes.

The output of the substracter 4 is also connected to an empty-detector 7, which detects whether or not the instruction buffer 1 includes no instruction code.

An output of the full-detector 6 is connected to a fetch controller 9, which determines the possibility of an instruction code access request on the basis of the output of the full-detector 6, and then, transmits an instruction buffer input request signal to an arbiter 11 and receives an instruction buffer input acknowledge signal from an arbiter 11. When the controller 9 receives the input acknowledge signal, the controller 9 outputs an update signal to the head pointer 2 and a fetch counter 5. The fetch counter 5 counts the update signal to monitor how many instruction codes have been read since the time when the control of instruction execution was transferred on account of the execution of branch instruction, the occurrence of interrupt, or the like. This fetch counter 5 is reset with an instruction queue clear signal through a terminal 23 from the decoder. This clear signal is also supplied to the two pointers 2 and 3. Further, a count output of the fetch counter 5 is connected to a counter detector 8, which in turn detects whether or not the output of the fetch counter 5 has reached one or more specified values. This detector 8 is connected at its output to the arbiter 11.

The arbiter 11 determines, on the basis of the output of the counter detector 8, the priority between an instruction buffer input request signal transmitted by the fetch controller 9 and an operand request signal (through a line 26) transmitted by the decoder or an instruction execution section. Then, the arbiter outputs either the input instruction buffer input acknowledge signal to the fetch controller 9 or an operand acknowledge signal (through a line 27) to the instruction execution section, and as well issues a control signal to the data bus switch 12, and a bus cycle start timing signal to a bus cycle controller 13.

This data bus switch 12 responds to the control signal to selectively connect the data terminal 21, which is a terminal of access bus to external memory or cache memory, to either the instruction buffer 1 or the operand data bus 28.

The bus cycle controller 13 receives the bus cycle starting timing signal and its type signal, and in the case of the instruction code access, controls the access method and access frequency according to the output of the counter detector 8.

The shown system also includes a delivery controller 10 which receives through a line 24 a request signal for loading an instruction code from the instruction buffer 1 to the decoder. This request signal is dispatched from the decoder. Further, the delivery controller 10 also receives the output of the empty detector 7 so as to determine the possibility of the instruction loading. If it is possible, the delivery controller 10 outputs an instruction load acknowledge signal through a line 25 to the decoder.

The operation of the present embodiment realized as above will be explained as follows. The operation of the present embodiment is characterized by parallel processing of two operations, that is, instruction code access and instruction code supply.

Firstly, instruction code access processing will be explained. The fetch controller 9 judges the possibility of the instruction code access on the basis of the output of the full-detector 6, and if accessible, notifies the instruction buffer input request signal to the arbiter 1. The arbiter 11 determines, in accordance with the output of the counter detector 8, the priority between the instruction buffer input request signal transmitted by the fetch controller and the operand request signal sent by the decoder or the instruction execution section, and notifies the access given with top priority among the two request signals to the bus cycle controller 13, and simultaneously controls the data path switch 12 to select a data bus for the top priority access. The bus cycle controller 13, at the receipt of the notice, determines the access method or the access frequency, and thereafter causes to start a bus cycle. As a consequence, data from the external memory or cache memory through the data terminal 21 comes to be inputted to the instruction buffer 1 through the data bus switch 12. Thereafter, the fetch controller 9 outputs a signal to update both the head pointer 2 and the fetch counter 9.

The updated result of the head pointer 2 is inputted to the modulo substracter 4. The modulo substracter 4 newly computes the amount of instruction codes stored in the instruction buffer 1, and notifies its computed result to the full-detector 6 and the empty-detector 7. It is judged in the full-detector 6 whether or not the instruction buffer 1 will be full by the next instruction code access, and its result is notified to the fetch controller 9. The fetch controller 9 judges the possibility of the next instruction code access.

On the other hand, the updated or incremented result of the fetch counter 5 is inputted to the counter detector 8. The counter detector 8 executes the logic operation as shown in TABLE I, and notifies its result to the arbiter 11 and the bus cycle controller 13. This result will be used at the next instruction code access.

TABLE I

| COUNTED VALUE OF INSTRUCTIONS (OUTPUT OF FETCH COUNTER 5) $x$ | PRIORITY OF CODE ACCESS (OUTPUT TO ARBITER 11) | NUMBER OF BUS CYCLES (OUTPUT TO BUS CYCLE CONTROLLER 13) |
|---|---|---|
| $0 \leq x < p$ | HIGH | 2 |
| $p \leq x < m$ | HIGH | 1 |
| $m \leq x$ | LOW | 1 | where p and m are constants respectively obtained from the averaged run length and set in the count detector.

As seen from TABLE I, when the output "x" of the fetch counter 5 is less than the value "m", the counter detector 8 outputs a high level signal to the arbiter 11 so that the arbiter 11 gives the instruction code access a priority higher than that of the operand access. Namely, the switch 12 is set to connect the data terminal 21 to the instruction buffer 1. To the contrary, when the output "x" of the fetch counter 5 is not less than the value "m", the counter detector 8 outputs a low level signal to the arbiter 11 so that the arbiter 11 gives the operand access a priority higher than that of the instruction code access. In this case, the switch 12 is set to connect the data terminal 21 to the operand data terminal 28. Further, if "x" is less than "p", the counter detector 8 outputs a signal indicative of "2" to the bus cycle controller 13, so that two bus cycles are continuously carried out in the instruction code access. But, if "x" is not less than "p", the counter detector 8 output a signal indicative of "1" to the bus cycle controller 13, so that one bus cycle is executed either in the instruction code access or in the operand access.

Next, instruction supply processing will be explained. The delivery controller 10, receiving the instruction code load request signal through the line 24 from the decoder, judges the possibility of loading the instruction codes on the basis of the output of the empty-detector 7, and if supply is possible, issues an instruction code load acknowledge signal to the decoder. At the same time, among the instruction codes in the instruction buffer 1, one specified by the tail pointer 3 is supplied to the decoder. Thereafter, the delivery controller 10 outputs an updating signal to the tail pointer 3. The result thus updated of the tail pointer is inputted to the modulo substracter 4. The modulo substracter 4 computes the amount of instruction codes stored in the instruction buffer 1, and notifies its computed result to the full-detector 6 and the empty-detector 7. It is judged in the empty-detector 7 whether or not the instruction queue is empty or not at the present time, and the result of the judgment is notified to the delivery controller 10. By this notice, the delivery controller 10 judges the possibility of loading the next instruction code.

In this embodiment, invalidation of the queue's content can be processed as a special processing, other than aforementioned ordinary two processings, namely, instruction code fetch and instruction code supply. The actual processing is as follows: When it is judged that a branch instruction is detected in the decoder, or when an interrupt is notified to the computer system, an instruction queue content invalidation signal 23 is issued. This signal is supplied to the head pointer 2, the tail pointer 3, the fetch counter 5 so as to initialize them. As a result, the instruction buffer 1 is regarded as empty.

Thus, it becomes possible to determine the priority of instruction code access and consecutive access frequency on the basis of the difference between the average run length and instruction code count number in the fetch counter. Furthermore, it is possible to determine the priority of instruction code access and consecutive access frequency on the basis of the difference and the amount of instruction codes stored in the instruction queue. Specifically, the smaller the value of the fetch counter 5 is, the priority of the instruction code access is set at a higher level, and the number of consecutively executed instruction code accesses is also set at the upmost level. On the other hand, the priority of the instruction code access is lowered and the number of the continuously executed instruction code access is reduced when the instruction code count number in the fetch counter arrives at one of several values set up in the counter detector in relation to the average run length.

Thus, in the above embodiment, it becomes possible to stabilize the instruction code supply, since a required amount of instruction codes are ensured into the instruction queue for pipeline processing, by setting up both the priority order of instruction code's memory access and consecutive access frequency at the uppermost level, immediately after either branch instruction execution or interrupt occurrence.

Furthermore, the present invention has an effect of minimizing the average value of instruction codes stored in the buffer but invalidated at a discontinuous program control such as branch or interrupt, by means of reducing consecutively executed access frequency of the instruction codes or lowering the priority order, after there has been read out the amount of instruction codes as much as an average run length from one branch instruction to the next branch instruction, so that it is inhibited or suppressed to read or prefetch instruction codes which would be invalidated or cleared with a high probability at the time of the next branch instruction execution.

Thus, it is possible to decrease the average amount of the instruction codes stored in the instruction queue invalidated at the discontinuation of pipelined operation.

In the embodiment mentioned above, the counter detector 8 compares the two constants "p" and "m"

with the output of the fetch counter 5. This detector 8 can be associated with a register capable of setting these values at an optional level. It becomes possible for an operator to set up optimum parameter values in the registers in accordance with various kinds of software employed in the computer system, based upon a statistical result obtained through simulation.

Furthermore, it is possible to dynamically modify the values "p" and "m" set in the counter detector 8 while accumulating a statistical data in regard to run length. Therefore, it becomes possible for computer system to adjust itself in accordance with the nature of a given program in order not to have futile instruction code access.

Furthermore, it is possible to execute more elaborate instruction code access control on the basis of the priority, the memory access frequency, and their combination by means of setting up not only two values "p" and "m", but also one or more values in the counter detector. To the contrary, it is also possible to execute the instruction code access control only for either the priority order or the memory access frequency by means of setting up only either of "p" and "m" in the counter detector.

The invention has thus been shown and described with reference to specific embodiments. However, it should be noted that the invention is in no way limited to the details of the illustrated structures but changes and modifications may be made within the scope of the appended claims.

I claim:

1. An instruction code access control system used in an instruction code prefetched computer system which includes at least means for accumulating prefetched instruction codes, the instruction code accumulating means being cleared when one of a branch instruction, a call instruction and a return instruction is executed, and means for selectively coupling the instruction code accumulating means to a data path through which an instruction code and an operand data are selectively transferred, wherein the control system comprises:

counting means which is cleared when one of a branch instruction, a call instruction and a return instruction is executed, and operating for counting a total number of the instruction codes which have been inputted in the instruction code accumulating means from a time said one of a branch instruction, a call instruction and a return instruction is executed, means coupled to receive a value of the counting means indicative of said total number and comparing the value of the counting means with a predetermined value, and means coupled to the comparing means for determining, on the basis of an output of the comparing means, a priority between an instruction memory access for instruction code prefetching and an operand access caused as a result of an instruction execution, the priority determining means operating to control the selectively coupling means in accordance with the result of the determination.

2. A system as claimed in claim 1, wherein when the value of the counting means is less than said predetermined value, said priority determining means operates on the basis of said output of the comparing means so as to give the instruction memory access for instruction code prefetching a priority higher than that for the operand access caused as the result of the instruction execution.

3. An instruction code access control system used in an instruction code prefetched computer system which includes at least an instruction buffer for accumulating prefetched instruction codes and which is cleared when a discontinuous program is carried out, and a data path switch coupled to an input of the instruction buffer and also coupled to a memory access bus and an operand data bus for selectively coupling the memory access bus to the instruction buffer and the operand data bus, wherein the control system comprises:

means for counting a total number of the instruction codes which have been fetched into the instruction buffer from a time that a discontinuous program operation is carried out;

means coupled to receive a value of the counting means indicative of said total number and comparing the value of the counting means with a predetermined value;

means coupled to the comparing means for determining, on the basis of an output of the comparing means, a priority between an instruction memory access for instruction code prefetching and an operand access caused as a result of an instruction execution, the priority determining means operating to control the data path switch in accordance with the result of the determination, and a fetch controller for generating a signal to the instruction buffer so that the buffer fetches an instruction code, wherein the counting means includes a fetch counter operating to count the signal from the fetch controller and cleared with a clear signal, said comparing means includes a counter detector for comparing a count value of the fetch counter with the predetermined value so as to generate a first comparison signal when the count value of the fetch counter is less than the predetermined value, so that the priority determining means responds to the first comparison signal to cause the data path switch to couple the memory access bus to the instruction buffer.

4. A system as claimed in claim 3, wherein the determining means includes an arbiter receiving the first comparison signal from the counter detector, an instruction buffer input request signal from the fetch controller and an operand request signal, the arbiter operating to respond to the first comparison signal to control the data path switch and to selectively output either an instruction buffer input acknowledge signal or an operand acknowledge signal.

5. A system as claimed in claim 4, wherein the counter detector operates to generate a second comparison signal when the count value of the fetch counter is less than a second predetermined value which is less than the first mentioned predetermined value, and the arbiter operates to generate the highest priority signal for access in response to the second comparison signal, and further including a bus cycle controller receiving the second comparison signal and the highest priority access signal to generate a bus cycle start signal.

6. A system as claimed in claim 4, further including a head pointer and a tail pointer coupled to the instruction buffer so as to indicate a head and a tail of instruction codes stored in said instruction buffer, respectively, the head pointer and the tail pointer being cleared by the clear signal, the head pointer being updated by an update signal from the fetch controller, a subtracter connected to the head pointer and the tail pointer to generate a difference signal representative of the amount of the instruction codes stored in the instruction buffer, and a full detector connected to receive the difference signal so as to control the fetch controller so that the fetch controller generates the instruction buffer input request signal to the arbiter.

7. A system as claimed in claim 6 further including an empty detector connected to receive the difference signal, and a delivery controller connected to the empty detector and operating to generate an instruction code load acknowledge signal in response to an instruction code load request signal when the instruction buffer is not empty, the delivery controler operating to supply an updating signal to the tail pointer.

8. An instruction code access control system used in an instruction code prefetched computer system which includes at least means for accumulating prefetched instruction codes, the instruction code accumulating means being cleared when one of a branch instruction, a call instruction and a return instruction is executed, and means for selectively coupling the instruction code accumulating means to a data path through which an instruction code and an operand data are selectively transferred, wherein the control system comprises:

counting means which is cleared when one of a branch instruction, a call instruction and a return instruction is executed, and operating for counting a total number of the instruction codes which have been inputted in the instruction code accumulating means form a time said one of a branch instruction, a call instruction and a return instruction is executed, means coupled to receive a value of the counting means indicative of said total number and having a first predetermined value for comparing the value of the counting means with the first predetermined value and generating a first comparison signal when the value of the counting means is less than said first predetermined value, and priority determining means coupled to the comparing means and operating to respond to said first comparison signal so as to give an instruction memory access for instruction code prefetching a priority higher than that for an operand access caused as a result of an instruction execution, whereby the priority determining means controls the selectively coupling means to couple the instruction code accumulating means to said data path in response to an instruction buffer input request signal.

9. A system as claimed in claim 8, wherein said comparing means has a second predetermined value less than the first predetermined value and operates to generate a second comparison signal when the value of the counting means is less than said second predetermined value, said priority control means responding said second comparison signal so as to give the highest priority to the instruction memory access for instruction code prefetching.

* * * * *